United States Patent
Wagner

(10) Patent No.: US 8,813,898 B2
(45) Date of Patent: Aug. 26, 2014

(54) METHOD FOR STABILIZING A MOTOR VEHICLE, IN PARTICULAR A TWO-WHEELED MOTOR VEHICLE

(75) Inventor: Marcus Wagner, Brackenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/138,430

(22) PCT Filed: Jan. 8, 2010

(86) PCT No.: PCT/EP2010/050117
§ 371 (c)(1), (2), (4) Date: Oct. 25, 2011

(87) PCT Pub. No.: WO2010/099987
PCT Pub. Date: Sep. 10, 2010

(65) Prior Publication Data
US 2012/0031696 A1 Feb. 9, 2012

(30) Foreign Application Priority Data
Mar. 3, 2009 (DE) .......... 10 2009 001 306

(51) Int. Cl.
*B60K 28/14* (2006.01)
*B60G 17/016* (2006.01)

(52) U.S. Cl.
USPC .............. 180/282; 180/285; 180/219; 701/76

(58) Field of Classification Search
USPC .......... 180/218, 219, 282–285; 280/124.105, 280/755, 124.104, 5.513; 701/70, 72, 76, 701/78–80; 303/146–148
See application file for complete search history.

(56) References Cited

U.S. PATENT DOCUMENTS

| 4,572,317 | A * | 2/1986 | Isono et al. .................. 180/227 |
| 7,023,330 | B2 * | 4/2006 | Kamen et al. ................ 340/427 |
| 7,281,722 | B2 * | 10/2007 | Fukuda et al. ......... 280/124.104 |
| 7,377,522 | B2 * | 5/2008 | MacIsaac .................. 280/5.507 |
| 7,690,452 | B2 * | 4/2010 | Kamen et al. ................ 180/65.1 |
| 7,873,458 | B2 * | 1/2011 | Todd .............................. 701/70 |
| 7,900,752 | B2 * | 3/2011 | Mayberry et al. ........... 188/71.5 |
| 2004/0098185 | A1 * | 5/2004 | Wang ............................. 701/70 |
| 2007/0024022 | A1 * | 2/2007 | Weagle ........................ 280/286 |
| 2007/0213904 | A1 * | 9/2007 | Watanabe et al. .............. 701/45 |
| 2010/0140009 | A1 * | 6/2010 | Kamen et al. ................ 180/282 |

FOREIGN PATENT DOCUMENTS

| DE | 195325521 | * | 3/1997 |
| DE | 102 35 378 | | 2/2004 |
| DE | 10 2004 060 292 | | 7/2006 |
| DE | 10 2005 028 995 | | 1/2007 |
| GB | 2 386 103 | | 9/2003 |
| JP | 2008-546586 | | 12/2008 |
| WO | WO 2004/103786 | | 12/2004 |
| WO | WO 2007/020271 | | 2/2007 |

* cited by examiner

*Primary Examiner* — Paul N Dickson
*Assistant Examiner* — George Spisich
(74) *Attorney, Agent, or Firm* — Kenyon & Kenyon LLP

(57) ABSTRACT

A method for stabilizing a two-wheeled motor vehicle includes determining a current pitch angle of the motor vehicle, and limiting the pitch angle to a specified boundary pitch angle by an intervention using an intervention component of the motor vehicle causing the longitudinal acceleration of the motor vehicle to be influenced.

13 Claims, 1 Drawing Sheet

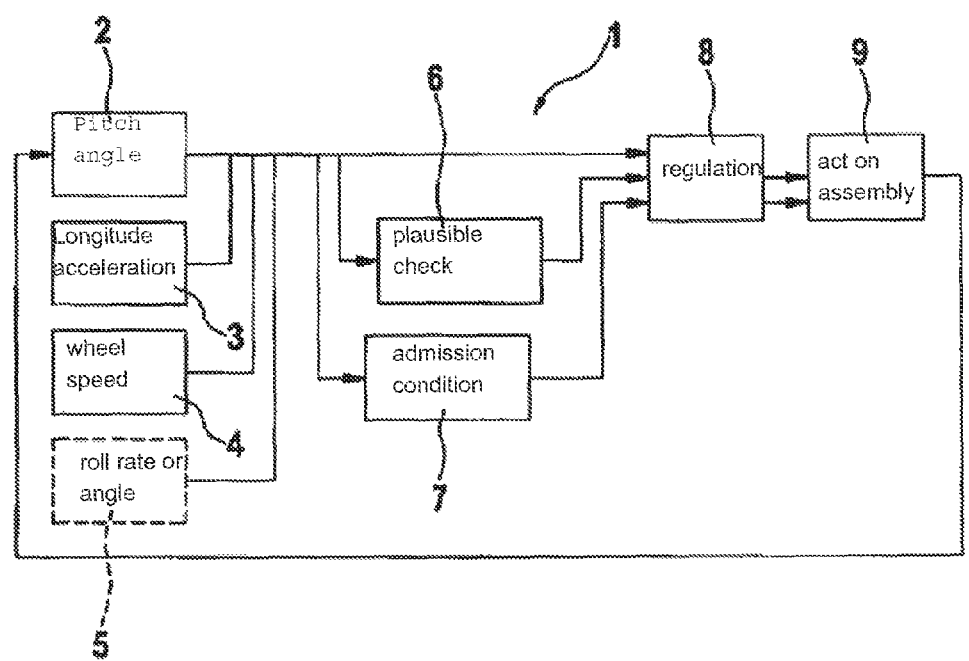

METHOD FOR STABILIZING A MOTOR VEHICLE, IN PARTICULAR A TWO-WHEELED MOTOR VEHICLE

BACKGROUND OF THE INVENTION

1. Field of the Invention

The present invention relates to a method for stabilizing a motor vehicle, in particular a two-wheeled motor vehicle.

2. Description of Related Art

A method for brake control in a motorcycle is known from published German patent application document DE 102 35 378 A1, in which the side tilt of the motor vehicle is recorded using a yaw-rate sensor, and the brake regulation takes place as a function of the side tilt detected. This is intended to prevent skidding or lateral slipping away of the motorcycle during cornering.

A method for ascertaining the angle of inclination of a motorcycle is known from published German patent application document DE 10 2004 060 292 A1, in which, by using at least two yaw rate sensors, the yaw rates of the motorcycle about two different axes are ascertained, and from the yaw rates, the roll angle and perhaps also the pitch angle is determined.

BRIEF SUMMARY OF THE INVENTION

The present invention is based on the object of improving the driving safety in a motor vehicle, using simple measures.

The method according to the present invention relates to the stabilization of a motor vehicle, particularly a two-wheeled motor vehicle such as a motorcycle during an acceleration process. In order to prevent uncontrollable driving situations, the current pitch angle of the motor vehicle is determined, according to the present invention, measures being taken so that the current pitch angle does not exceed a boundary pitch angle. To do this, in the motor vehicle a control element is acted upon in such a way that the motor vehicle's longitudinal acceleration is reduced or limited to the extent that the boundary pitch angle is not exceeded.

The limitation to the boundary pitch angle is performed via an intervention in an assembly of the motor vehicle by which the longitudinal acceleration is able to be influenced. This assembly is, for example, the braking system for braking the rear wheel. Throttling the engine torque may also be taken into consideration, that is, influencing the drive engine, for instance by limiting the fuel injection or limiting the corresponding air mass in the internal combustion engine of the motor vehicle. These measures for reducing the motor vehicle's longitudinal acceleration may be carried out alternatively or cumulatively. The measure that is to be carried out may be a function of additional state variables or operating variables, such as of the absolute size of the longitudinal acceleration or the increase in the longitudinal acceleration, for a limitation of the pitch angle that is to be carried out very rapidly, preferably a braking intervention being undertaken, and only subsequently a throttling of the engine torque, whereas, in the case of a slow approach to the pitch angle boundary, an exclusive throttling of the engine torque may be sufficient.

The boundary pitch angle represents a boundary value or a threshold value that must not be exceeded. In this instance, one may consider a specification as a fixed variable, such as by limiting to a maximum value that must not be exceeded.

Beyond that, it is also possible variably to determine the boundary pitch angle as a function of the current driving situation, particularly as a function of the current driving state variables or operating variables. Thus, it may, for instance, be expedient to make the boundary pitch angle a function of a lateral dynamic state variable, in such a way that, at a large value, or an increasing lateral dynamic state variable the boundary pitch angle is set or reduced to a small value. This ensures that, for instance, during cornering, the stability of the motor vehicle remains assured, by, for instance, reducing the boundary pitch angle to zero, so that the front wheel has ground contact and is in a position to transmit lateral guiding forces. As the lateral dynamic state variable, the roll angle, the lateral acceleration and/or the yaw rate of the motor vehicle may be considered. The state variables may go into the determination of the boundary pitch angle both individually and cumulatively.

According to one additional expedient embodiment, it is provided that a plausibility check of state variables be carried out, which are taken into account in the ascertainment of the boundary pitch angle or the process of limiting the actual pitch angle. In the plausibility check, for one thing, in certain driving situations, measured state variables may be checked for plausibility. Thus, when driving straight ahead in idle, that is, when there is no engine torque requirement, the motor vehicle is directed straight ahead and is in an upright state, so that the roll angle as well as the measured value of the longitudinal acceleration each have to take up the value zero or approximately zero. Furthermore, the rotational speeds of the front wheel and the rear wheel have to have the same magnitude, at least approximately.

For another thing, it is also possible to ascertain the actual pitch angle in two different ways, which increases the certainty with respect to measuring errors. According to a preferred embodiment, for example, the pitch angle is determined by the integration of the measured pitch rate. However, for the plausibility check, a comparison pitch angle may additionally be determined from a further state variable of the motor vehicle. The comparison pitch angle is determined from the longitudinal acceleration of the motor vehicle while taking into account the vehicle geometry, for example. Additional measured variables, such as the wheel speeds of the motor vehicle, may be taken into account in this case.

In the case of a deviation between the current pitch angle and the comparison pitch angle, the greater pitch angle value is preferably taken into account, for safety reasons, and on it an assembly of the motor vehicle is based. The longitudinal acceleration of the motor vehicle is then more greatly reduced than would be the case if the smaller pitch angle formed the basis.

The measured values required for carrying out the method are ascertained, for example, using a 6D measuring technique which, for instance, is included in a domain control unit. Basically, as inertial signals required, only the pitch rate is needed, from which, by integration, the pitch angle is able to be determined, as well as the longitudinal acceleration, if necessary. Further measuring signals, such as the wheel speeds, may be obtained from an antilock system implemented in the vehicle.

BRIEF DESCRIPTION OF THE DRAWINGS

FIG. 1 shows a functional block diagram for illustrating the regulating of the front wheel height.

DETAILED DESCRIPTION OF THE INVENTION

As may be seen in block diagram 1 of FIG. 1, to regulate the front wheel height, in a first block 2, current pitch angle θ of a two-wheeled motor vehicle such as a motorcycle is first determined. Pitch angle θ designates the angle at which the motorcycle is lifted about a transverse axis, slantwise to the vehicle's forward direction, pitch angle=0 meaning that the front wheel has contact with the roadway, and pitch angle>0 meaning a lifting off of the front wheel from the roadway.

Pitch angle θ is determined, for instance, by measuring the pitch rate θ and subsequent integration of the pitch rate. In a subsequent step according to block 8, regulation takes place to a setpoint value $θ_d$ of the pitch angle, which is implemented in a next step according to block 9, by acting upon an assembly in the motorcycle. As the assembly, the braking system particularly comes into consideration and/or an intervention in the engine management, so as to throttle the engine torque. In this way a limitation is achieved of the current pitch angle θ to boundary pitch angle $θ_d$, which thus represents a maximum value for the pitch angle.

In principle, additional state variables may be taken into account for the limitation of the pitch angle, which is symbolized by blocks 3, 4 and 5. Thus, it may be expedient, according to block 3, additionally to take into account the longitudinal acceleration $a_x$ of the motorcycle, according to block 4 wheel speeds ω at the front wheel and the rear wheel, as well as, according to block 5 also the roll rate or roll angle φ.

Taking into account these additional state variables takes place particularly via additional blocks 6 and 7, which represent plausibility checks of state variables in the system and a condition that has to be satisfied so that the intervention in the braking system or the engine management is carried out so as to limit the pitch angle.

The plausibility check according to block 6 may be carried out in such a way that a comparison pitch angle $θ_c$ is determined from further state variables of the motorcycle, a comparison being carried out between comparison pitch angle $θ_c$ and current pitch angle θ. As additional state variables, which are drawn upon for ascertaining comparison pitch angle $θ_c$, one may take into consideration longitudinal acceleration $a_x$ of the motorcycle while taking into account the motorcycle geometry, and perhaps also wheel speeds ω.

If a comparison between current pitch angle θ and comparison pitch angle $θ_c$ says that there is a deviation between the pitch angle values, then, for safety reasons, the larger pitch angle may be selected and have it be the basis for the subsequent regulation.

In the admission condition according to block 7, boundary pitch angle $θ_d$ is ascertained as a function of additional state variables in the vehicle. In this process, particularly lateral dynamic state variables are taken into account, for instance, roll angle φ, but possibly also transverse acceleration $a_y$ or yaw rate ψ, in order to make sure that, in driving situation in which lateral grip forces have to be built up at the tires, there is also contact between the front wheel and the roadway; in this case, boundary pitch angle $θ_d$ is set to the value 0. In such driving situations, cornering is involved, for example, having relatively great roll angles φ and a large transverse acceleration $a_y$.

Boundary pitch angle $θ_d$ may also be established as a function of longitudinal dynamic state variables. For example, it may be expedient to admit only smaller boundary pitch angles $θ_c$ at higher speeds, for safety reasons.

The value for boundary pitch angle $θ_c$, ascertained in block 7, goes into block 8, that symbolizes the regulation, and is there made the basis for the regulation.

What is claimed is:

1. A method for stabilizing a two-wheeled motor vehicle, comprising:
   determining a current pitch angle of the motor vehicle; and
   limiting the pitch angle to a specified boundary pitch angle by an intervention using an intervention component of the motor vehicle causing the longitudinal acceleration of the motor vehicle to be influenced;
   wherein:
   the current pitch angle is determined by integrating a measured pitch rate; and
   the boundary pitch angle is determined during running operation of the motor vehicle as a function of one of a state of the motor vehicle and an operating variable of the motor vehicle.

2. The method as recited in claim 1, wherein the intervention component is a braking system of the motor vehicle, the braking system being actuated for limiting the pitch angle.

3. The method as recited in claim 1, wherein the intervention component is an engine of the motor vehicle, the engine torque of the motor vehicle being throttled for limiting the pitch angle.

4. The method as recited in claim 1, wherein the boundary pitch angle is a function of one of a longitudinal or a lateral dynamic state variable, the boundary pitch angle being reduced with an increase in the one of the longitudinal or lateral dynamic state variable.

5. The method as recited in claim 4, wherein the lateral dynamic state variable includes at least one of a roll angle, a transverse acceleration, and a yaw rate.

6. The method as recited in claim 4, wherein the longitudinal dynamic state variable includes a vehicle speed.

7. The method as recited in claim 4, wherein the boundary pitch angle is limited to a specified maximum value.

8. The method as recited in claim 4, further comprising:
   performing a plausibility check for each measured value by comparing the measured value to a comparison value.

9. The method as recited in claim 8, further comprising:
   determining a comparison pitch angle from at least one additional state variable of the motor vehicle.

10. The method as recited in claim 9, wherein the comparison pitch angle is determined from a longitudinal acceleration of the motor vehicle.

11. The method as recited in claim 10, wherein in the case of a deviation between the current pitch angle and the comparison pitch angle, the larger pitch angle value is used.

12. The method as recited in claim 8, wherein the measured values of rotational speed sensors at front and rear wheels of the motor vehicle are checked for plausibility by using the measured values of a longitudinal acceleration sensor.

13. A control unit for stabilizing a two-wheeled motor vehicle, comprising:
   means for determining a current pitch angle of the motor vehicle; and
   means for limiting the pitch angle to a specified boundary pitch angle by an intervention using an intervention component of the motor vehicle causing the longitudinal acceleration of the motor vehicle to be influenced;
   wherein:
   the current pitch angle is determined by integrating a measured pitch rate; and
   the boundary pitch angle is determined during running operation of the motor vehicle as a function of one of a state of the motor vehicle and an operating variable of the motor vehicle.

* * * * *